(12) United States Patent
Le (10) Patent No.: US 12,404,712 B2
(45) Date of Patent: Sep. 2, 2025

(54) HANDS-FREE ASSEMBLY FOR A PASSENGER VEHICLE

(71) Applicant: Safran Seats USA LLC, Gainesville, TX (US)

(72) Inventor: Nguyen Tien Foek Le, Arlington, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/925,513

(22) PCT Filed: Aug. 11, 2020

(86) PCT No.: PCT/US2020/045798
§ 371 (c)(1),
(2) Date: Nov. 15, 2022

(87) PCT Pub. No.: WO2021/236138
PCT Pub. Date: Nov. 25, 2021

(65) Prior Publication Data
US 2023/0193683 A1    Jun. 22, 2023

Related U.S. Application Data

(60) Provisional application No. 63/026,534, filed on May 18, 2020.

(51) Int. Cl.
*E05F 15/73*    (2015.01)
*E06B 3/46*    (2006.01)

(52) U.S. Cl.
CPC ............ *E05F 15/73* (2015.01); *E06B 3/4654* (2013.01); *E05F 2015/765* (2015.01)

(58) Field of Classification Search
CPC ..................................................... E06B 3/4654
(Continued)

(56) References Cited

U.S. PATENT DOCUMENTS

2010/0253516 A1    10/2010    Lemerand et al.
2011/0156452 A1    6/2011    Schumm et al.
(Continued)

FOREIGN PATENT DOCUMENTS

CN    108909571 A    11/2018
DE    3723027 C1    9/1988
(Continued)

OTHER PUBLICATIONS

English language translation of WO-2019228594.*
(Continued)

*Primary Examiner* — Joseph D. Pape
(74) *Attorney, Agent, or Firm* — Kilpatrick Townsend & Stockton LLP (57) ABSTRACT

Described a passenger vehicle having a hands-free door assembly, the hands-free door assembly includes a stationary wall portion; a door portion moveable along at least one linear translation track; at least one actuator operable to move the door portion along the at least one linear translation track; and at least one sensor positioned on at least one of the stationary wall portion or the door portion, wherein the sensor receives a hands-free input and transmits an activation signal to the at least one actuator, and wherein the at least one actuator moves the door portion along the at least one linear translation track based on receiving the activation signal.

16 Claims, 7 Drawing Sheets

(58) Field of Classification Search
USPC .................................................. 49/354, 413
See application file for complete search history.

(56) References Cited

U.S. PATENT DOCUMENTS

| | | | |
|---|---|---|---|
| 2011/0259213 A1 | 10/2011 | Azizi | |
| 2014/0196372 A1 | 7/2014 | Boren et al. | |
| 2017/0283064 A1 | 10/2017 | Robinson | |
| 2019/0033978 A1 | 1/2019 | Eijkelenboom | |
| 2019/0210733 A1* | 7/2019 | Herault | B64D 11/0604 |
| 2022/0332423 A1* | 10/2022 | Thomas | B64D 11/0023 |

FOREIGN PATENT DOCUMENTS

| | | | | |
|---|---|---|---|---|
| DE | 102014105565 A1 | 10/2015 | | |
| DE | 102018113132 A1 | 12/2019 | | |
| EP | 2933184 A1 | 10/2015 | | |
| EP | 3299293 A1 | 3/2018 | | |
| EP | 3372503 A1 | 9/2018 | | |
| EP | 3643615 A1 | 4/2020 | | |
| GB | 2513160 A | 10/2014 | | |
| JP | 3686993 B2 * | 8/2005 | | |
| KR | 101759036 * | 7/2017 | | |
| WO | WO-2019228594 A1 * | 12/2019 | | B64D 11/02 |
| WO | 2021236137 A1 | 11/2021 | | |

OTHER PUBLICATIONS

International Patent Application No. PCT/US2020/045798, International Search Report and Written Opinion, dated Feb. 12, 2021.
European Application No. 20764191.1, Office Action mailed on Jun. 20, 2024, 6 pages.

* cited by examiner

HANDS-FREE ASSEMBLY FOR A PASSENGER VEHICLE

CROSS REFERENCE TO RELATED APPLICATIONS

This patent application is related to and claims priority benefits from U.S. Provisional Application Ser. No. 63/026,534, filed on May 18, 2020, entitled "TOUCHLESS ACTUATOR DOOR" ("the '534 application"). The '534 application is hereby incorporated in its entirety by this reference.

This patent application incorporates by reference the disclosure of one co-pending PCT patent application. This co-pending PCT patent application is "HANDS-FREE RELEASE SYSTEM FOR A PASSENGER SEAT," filed by Kristyan Khalil Escobar, Nicolas Chauland, and Mark Anil Mathew, PCT Application Serial No. PCT/US2020/045743, filed on Aug. 11, 2020. The disclosure of this application is hereby incorporated herein in its entirety by this reference.

FIELD OF THE INVENTION

The field of the invention relates to passenger vehicles, and, more particularly, to hands-free assemblies for a passenger vehicle.

BACKGROUND

Passenger vehicles, such as aircraft, buses, trains, ships, and automobiles, include a number of high-frequency contact areas on various parts of a passenger seat and throughout the passenger vehicle. These high-frequency contact areas have an increased chance of becoming contaminated with germs or pathogens transmitted through a passenger's and/or crew member's touching of the high-frequency contact areas. Each subsequent passenger or crew member to touch the high-frequency contact area runs the risk of contaminating themselves through contact with such areas. The emergence of the Coronavirus has led to an increased desire among passengers to inhibit the propagation of pathogens by reducing the number of hand-contact touch points present within the passenger vehicle.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger vehicle (which may incorporate features of any of the subsequent examples) comprising a hands-free door assembly, the hands-free door assembly comprising: a stationary wall portion; a door portion moveable along at least one linear translation track; at least one actuator operable to move the door portion along the at least one linear translation track; and at least one sensor positioned on at least one of the stationary wall portion or the door portion, wherein the sensor receives a hands-free input and transmits an activation signal to the at least one actuator, and wherein the at least one actuator moves the door portion along the at least one linear translation track based on receiving the activation signal.

In some embodiments, the at least one linear translation track is positioned at least partially within the stationary wall portion.

In certain embodiments, the at least one sensor comprises at least one of a proximity infrared sensor, a motion sensor, or an optical sensor.

The passenger vehicle may further comprise a lock positioned on at least one of the stationary wall portion or the door portion, wherein the sensor may receive a second contactless input and may transmit a lock signal to activate the lock and prevent movement of the door portion.

The hands-free input, in some embodiments, comprises a contactless input.

The door portion, in certain embodiments, comprises a first door member and a second door member, wherein the first door member comprises an edge moveable along the at least one linear translation track.

In some embodiments, the first door member is pivotable relative to the second door member.

According to certain embodiments of the present invention, a method for activating a hands-free door of a passenger vehicle (which may incorporate features of any of the preceding or subsequent examples), the method comprising: receiving a hands-free input from at least one sensor positioned on at least one of a stationary wall portion or a door portion; transmitting an activation signal to at least one actuator, wherein the at least one actuator is operable to move the door portion along at least one linear translation track; and activating the at least one actuator based on the activation signal to move the door portion along the at least one linear translation track.

In certain embodiments, the at least one linear translation track is positioned at least partially within the stationary wall portion.

The at least one sensor may comprise at least one of a proximity infrared sensor, a motion sensor, or an optical sensor.

The method, in some embodiments, further comprises receiving a second hands-free input from the at least one sensor; transmitting a lock signal to a lock positioned on at least one of the stationary wall portion or the door portion; and activating the lock to prevent movement of the door portion.

The hands-free input, in certain embodiments, comprises a contactless input.

The door portion may comprise a first door member and a second door member, wherein the first door member may comprise an edge moveable along the at least one linear translation track.

In some embodiments, the first door member is pivotable relative to the second door member.

According to certain embodiments of the present invention, a hands-free aircraft assembly (which may incorporate features of any of the preceding or subsequent examples) comprising: a moveable component; at least one actuator engaged with the moveable component; and at least one input receiver at least communicatively engaged with the at least one actuator, wherein actuation of the at least one actuator based on a hands-free input received by the at least one input receiver changes a position of the moveable component and is accomplished without direct contact by a passenger's hand.

In certain embodiments, the moveable component comprises at least one of a door portion, a tray table, a seat back, or a personal electronic device holder; the at least one actuator comprises at least one of a motor, a gear, a linear actuator, a cable, a belt, a piston, a pulley, or a cam; and the at least one input receiver comprises at least one of a sensor, a pedal, a button, a lever, or an audio input device.

The hands-free input may comprise a contactless input.

The moveable component, in some embodiments, is at least one of pivotable or moveable along a linear direction.

The method, in certain embodiments, further comprises a lock securable to the moveable component, wherein the lock is operable to maintain the moveable component in a closed position; wherein the at least one actuator is operable to move the lock between a locked position and an unlocked position based on receiving a lock activation signal from the at least one input receiver; and wherein the unlocked position releases the moveable component.

The position of the moveable component may be moveable between a stowed position and a deployed position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a hands-free aircraft assembly for passenger vehicles. In some embodiments, the hands-free aircraft assembly is incorporated into a passenger seat. While the hands-free aircraft assembly is discussed for use with aircrafts, it is by no means so limited. Rather, embodiments of the hands-free aircraft assembly may be used in trains, buses, ships, or other passenger vehicles of any type or otherwise as desired.

Incorporating hands-free aircraft assemblies into passenger vehicles may improve a passenger's interaction with various components of the passenger vehicle. For example, a hands-free aircraft assembly that controls the opening and closing of a first/business class seating compartment door, a lavatory door, or an overhead bin door may be utilized by a passenger whose hands are occupied. So a passenger may be holding various bags, personal items, or food or beverage items and still have the ability to open and close the first/business class seating compartment door, the lavatory door, or the overhead bin door.

Additionally, utilizing hands-free aircraft assemblies in passenger vehicles may reduce, and in some instances eliminate, the amount of contact the passenger or crew may have with high contact areas of the passenger vehicle, such as the first/business class seating compartment door, the lavatory door, or the overhead bin door. Reducing the amount of contact between the passenger or crew and high contact areas of the passenger vehicle may reduce the spread of viruses and pathogens between passengers and crew members as well as increase a passenger's sense of safety and confidence in travelling.

According to certain embodiments of the present invention, as shown in FIGS. 1-7B, a hands-free aircraft assembly 10 includes a moveable component 12, at least one actuator 14, and at least one input receiver 16.

The hands-free aircraft assembly 10, and any features of the hands-free aircraft assembly 10, may be formed of materials including but not limited to aluminum, stainless steel, aramid fibers, polycarbonate, polypropylene, other metallic materials, composite materials, or other similar materials.

In some embodiments, the moveable component 12 is a door portion of any suitable component of the passenger vehicle. For example, the moveable component 12 may be a door portion of a first/business class seating compartment. The door portion of the first/business class seating compartment may enclose a seat shell around the passenger and provide the passenger with increased privacy. The moveable component 12 may also be a door portion of a lavatory or an overhead bin. In further embodiments, the moveable component 12 may be at least one of a tray table, a seat back, a personal electronic device ("PED") holder, or any other suitable component of a passenger seat located within the passenger vehicle.

The moveable component 12 may be moveably coupled to a stationary component 18 so that the moveable component 12 moves relative to the stationary component 18. In some embodiments, the stationary component 18 may be a stationary wall portion. For example, the stationary component 18 may form at least part of the stationary wall portion of the seat shell surrounding the first/business class seating compartment.

Additionally, the stationary component 18 may include at least one linear translation track positioned either internal to the stationary component 18, external to stationary component 18, or partially internal and partially external to the stationary component 18. The moveable component 12 may be moveable along the at least one linear translation track.

Figure 1:
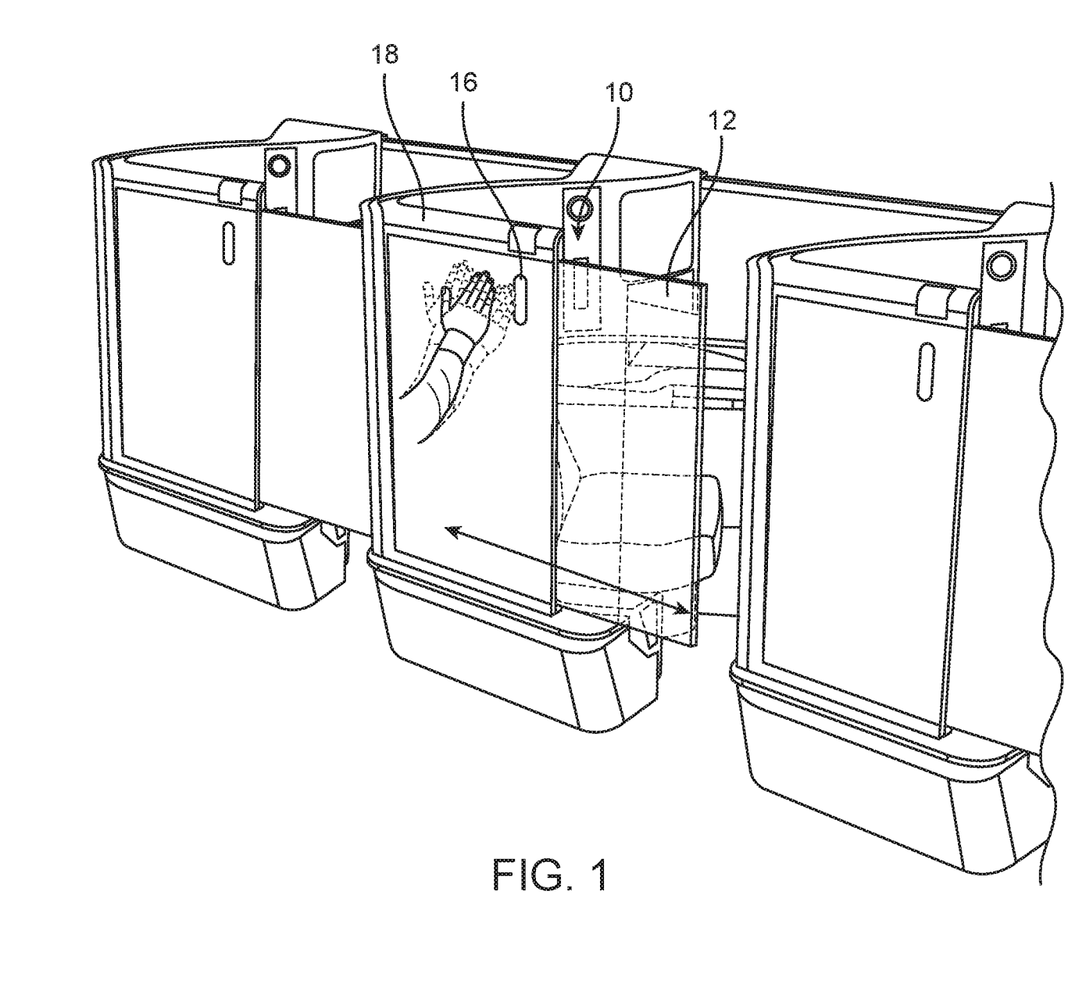
FIG. 1 is a front perspective view of a seat compartment incorporating a hands-free aircraft assembly, according to certain embodiments of the present invention.
Figure 2:
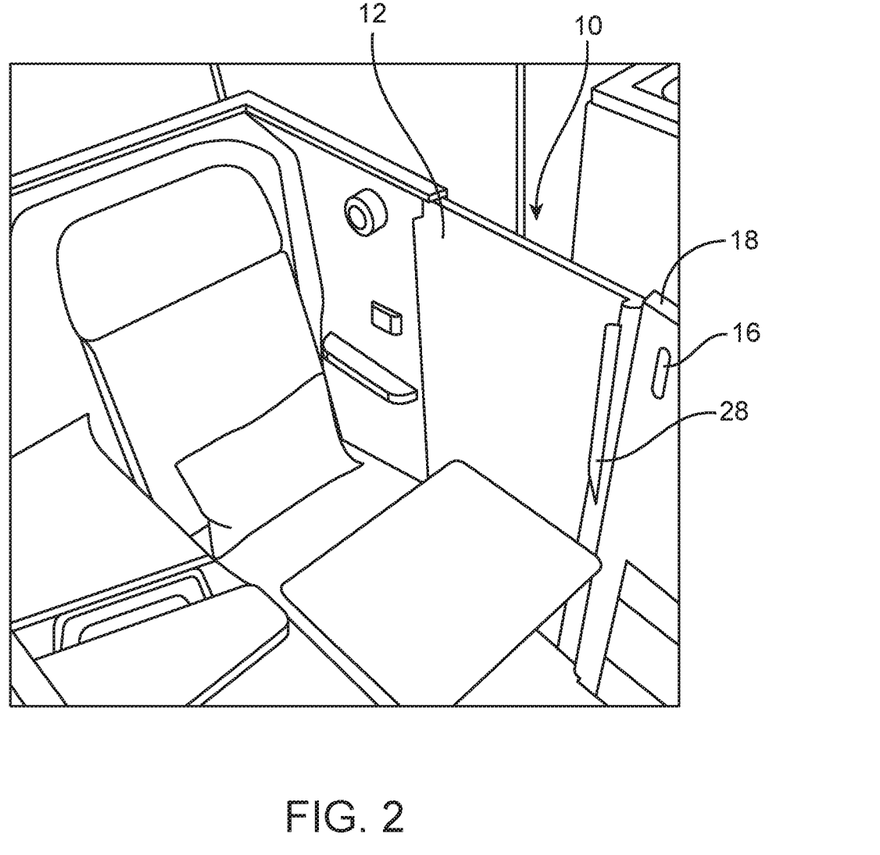
FIG. 2 is a rear perspective view of the interior of the seat compartment of
FIG. 1.
Figure 3:
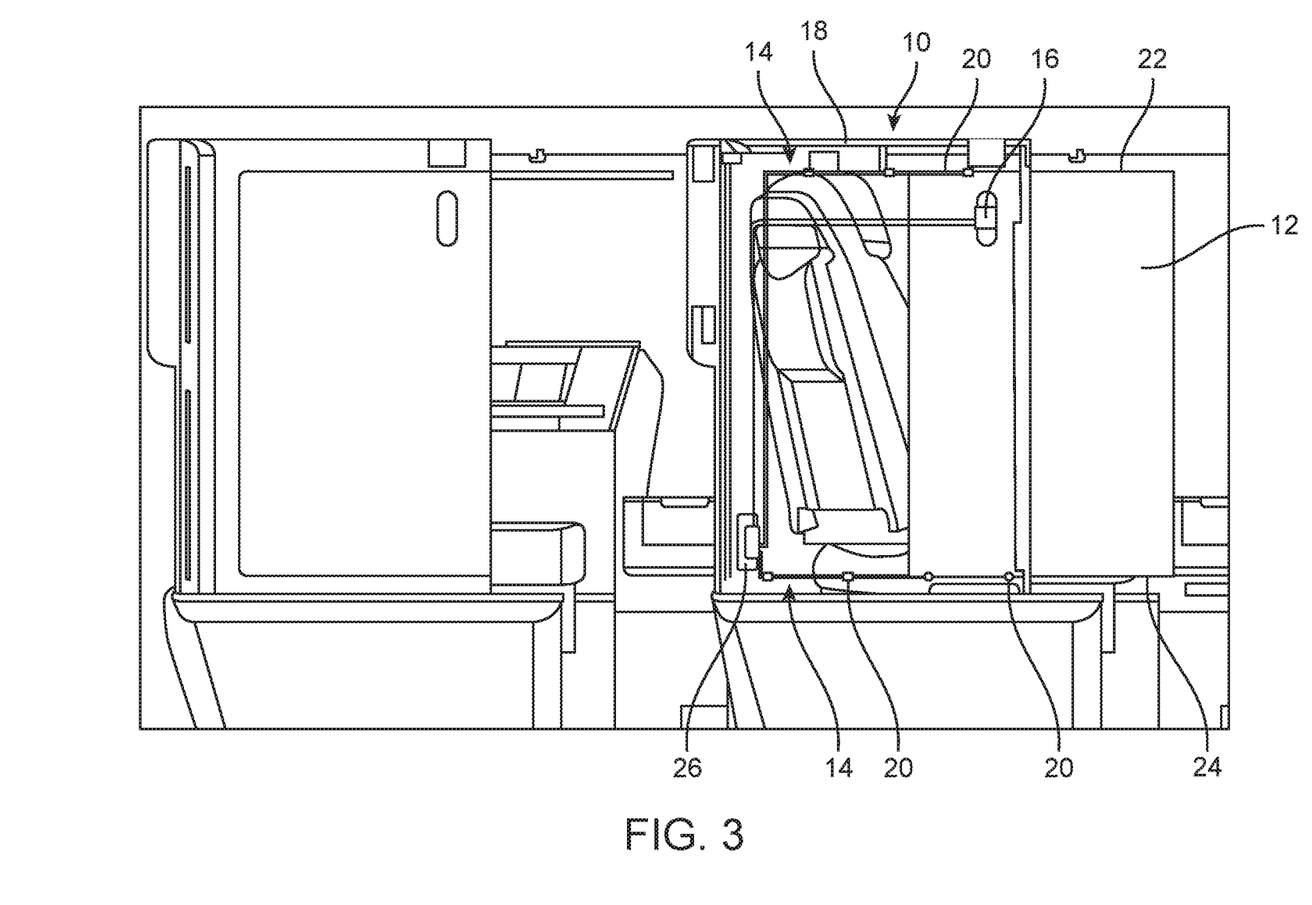
FIG. 3 is a front view of the seat compartment of FIG. 1 with the seat compartment shell covers removed.

In some embodiments, the at least one actuator 14 may include at least one of a motor, a gear, a linear actuator, a cable, a piston, a belt, a pulley, a cam, a lever, a torsion spring, or any other suitable device. As best shown in FIG. 3, the at least one actuator 14 may extend at least partially through an interior cavity of the stationary component 18. However, it is understood that the at least one actuator 14 may be arranged at any suitable location within the hands-free aircraft assembly 10.

The at least one actuator 14 may be engaged with or coupled to at least one portion of the moveable component 12 such that actuation of the at least one actuator 14 may cause the moveable component 12 to move. The selection of which actuator(s) 14 to use may depend on the space available in the hands-free aircraft assembly 10 and/or on how the moveable component 12 moves relative to the stationary component 18.

In some embodiments, the at least one actuator 14 may include a series of motors and gears 20 located within the interior cavity of the stationary component 18 and at least partially along an upper edge 22 and a lower edge 24 of the moveable component 12. The series of motors and gears 20 may function as the linear translation track and is coupled to a power source 26. Actuation of the series of motors and gears 20 upon receiving the power generated by the power source 26 may cause the moveable component 12 to slide into and out of the interior cavity of the stationary component 18 due to the rotational motion of the gears.

Additionally, the series of motors and gears 20 may serve as an alignment and stabilizing track for the moveable component 12. For example, the series of motors and gears 20 may be arranged so that there are always at least three points of contact between the moveable component 12 and the series of motors and gears 20. Having at least three points of contact between the moveable component 12 and the series of motors and gears 20 assists with constraining the moveable component 12 to reduce motion in the perpendicular direction and to reduce shaking and wobbling of the moveable component 12 as the moveable component 12 translates into and out of the stationary component 18.

Figure 4:
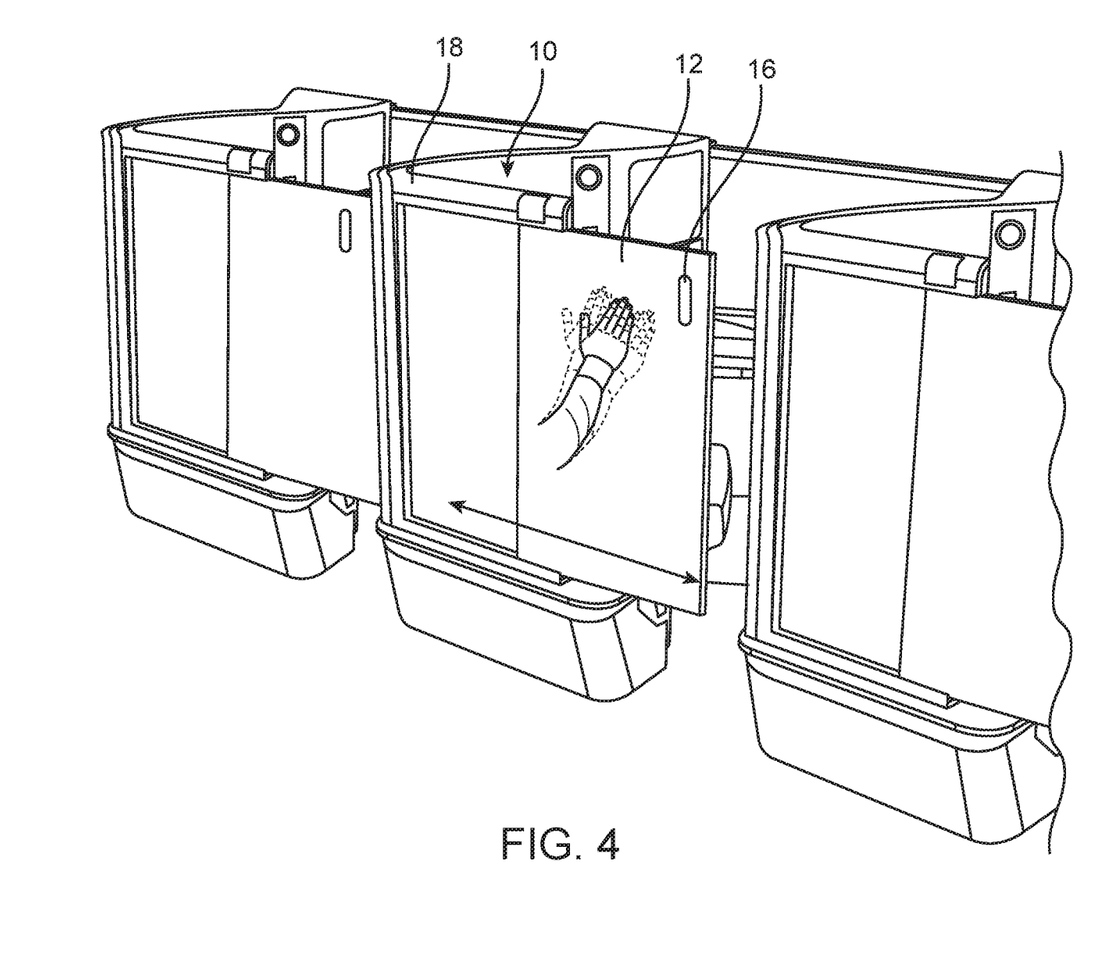
FIG. 4 is a front perspective view of another seat compartment incorporating a hands-free aircraft assembly, according to certain embodiments of the present invention.

In some embodiments, the at least one actuator 14 may be a linear actuator at least partly coupled to an exterior surface of the stationary component 18. As best shown in FIG. 4, coupling the linear actuator at least partly to the exterior surface of the stationary component 18 enables the moveable component 12 to move along the exterior surface of the stationary component 18.

The at least one input receiver 16 may be positioned at any suitable location within the hands-free aircraft assembly 10. For example, the at least one input receiver 16 may be positioned on at least one of an external surface of the moveable component 12, an internal surface of the moveable component 12, an external surface of the stationary component 18, an internal surface of the stationary component 18, or any other suitable location within the hands-free aircraft assembly 10. The at least one input receiver 16 may be any suitable size or shape. The size or shape of the at least one input receiver 16 may be determined based on the location of the at least one input receiver 16 within the hands-free aircraft assembly 10 and the dimensions of the component of the hands-free aircraft assembly 10 onto which the at least one input receiver 16 is coupled.

In some embodiments, the at least one input receiver 16 may include at least one of a sensor, e.g., a proximity infrared sensor, a motion sensor, an optical sensor, etc., a pedal, a button, a lever, an audio input device, or any other suitable device for receiving a hands-free input. The hands-free input is an input received without direct contact by a passenger's hand. This hands-free input may include contactless inputs such as a wave or other motion or gesture from the passenger, voice commands, etc. The hands-free input may also include contact with a body part of a passenger other than the passenger's hand, e.g., a foot, shin, knee, elbow, etc., or with a personal item, e.g., a pen, a stylus, a cane, etc.

The at least one input receiver 16 may be at least communicatively engaged with the at least one actuator 14 so that the at least one input receiver 16 may transmit signals to the at least one actuator 14. For example, the at least one input receiver 16 may be wired or wirelessly coupled to the at least one actuator 14. Upon receiving a hands-free input, e.g., a wave gesture by a passenger's hand, the at least one input receiver 16 will transmit an activation signal to the at least one actuator 14. Based on receiving the activation signal from the at least one input receiver 16, the at least one actuator 14 is activated, which causes a movement of the moveable component 12.

In some embodiments, the hands-free aircraft assembly 10 includes at least two input receivers 16. For example where the hands-free aircraft assembly 10 is incorporated into the first/business class seating compartment, one input receiver 16 may be positioned on a surface of the seating compartment facing a central aisle so that a passenger may provide a hands-free input to open the moveable component 12 and gain entry to the seating compartment.

Another input receiver 16 may be positioned on a surface of the seating compartment facing the interior of the seating compartment so that the passenger may provide a hands-free input to open the moveable component 12 and exit the seating compartment. Additionally, a single input receiver 16 may extend entirely through the moveable component 12 or the stationary component 18 so that the passenger may use the same input receiver 16 to open the moveable component 12 and both enter and exit the seating compartment.

In some embodiments, the hands-free aircraft assembly 10 may include a lock 28. The lock 28 may be any suitable shape and type based on the hands-free aircraft assembly 10. The lock 28 may be engaged to prevent movement of the moveable component 12. When the lock 28 is engaged to prevent movement of the moveable component 12, the lock is in a locked position. When the lock 28 is disengaged to release and permit movement of the moveable component 12, the lock is in an unlocked position.

Preventing movement of the moveable component 12 may be desired when the passenger has entered the seating compartment or lavatory and would like to maintain his/her privacy while occupying the seating compartment or lavatory. The lock 28 may be at least communicatively coupled to the at least one input receiver 16 so that the at least one input receiver 16 transmits a lock signal to the lock 28 upon receiving a second hands-free input from the passenger. The lock 28 is activated based on the lock signal and changes between the locked position and the unlocked position. Based on the lock signal, the lock 28 may engage with the moveable component 12 to prevent movement of the moveable component 12.

In some embodiments, the passenger vehicle may include an override system communicably coupled to each hands-free aircraft assembly 10 to prevent the locks 28 from engaging or to disengage those locks 28 that had been engaged. The override system may be manually activated, e.g., by the cabin crew or pilot, or may be automatically activated, e.g., when the passenger vehicle experiences an emergency. For example, the override system may be activated by the cabin crew during the boarding or de-boarding of the aircraft to allow movement of the moveable components 12. The override system may be individually activable for each hands-free aircraft assembly 10 that includes a lock 28 or may be activated to control the locks 28 for all of the hands-free aircraft assemblies 10 included in the passenger vehicle.

In some embodiments, a separate lock 28 may not be necessary to prevent movement of the moveable component 12. For example, the at least one input receiver 16 may transmit a lock signal to the at least one actuator 14 upon receiving a second hands-free input from the passenger. Based on this lock signal, the at least one actuator 14 may become disabled so as to prevent movement of the moveable component 12.

Figure 5A:
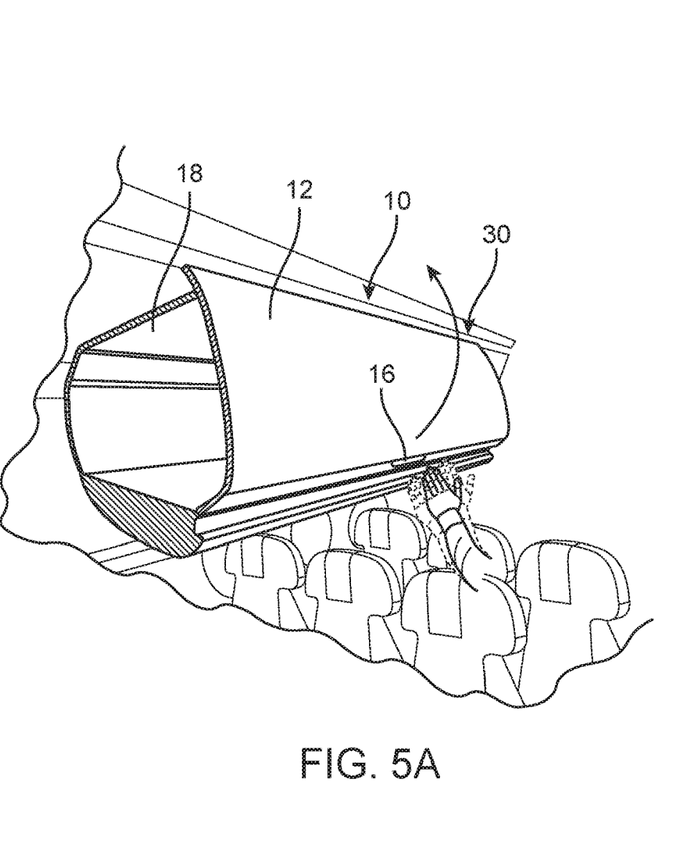
FIGS. 5A-5B are front perspective views of an overhead bin incorporating a hands-free aircraft assembly, according to certain embodiments of the present invention.
Figure 5B:
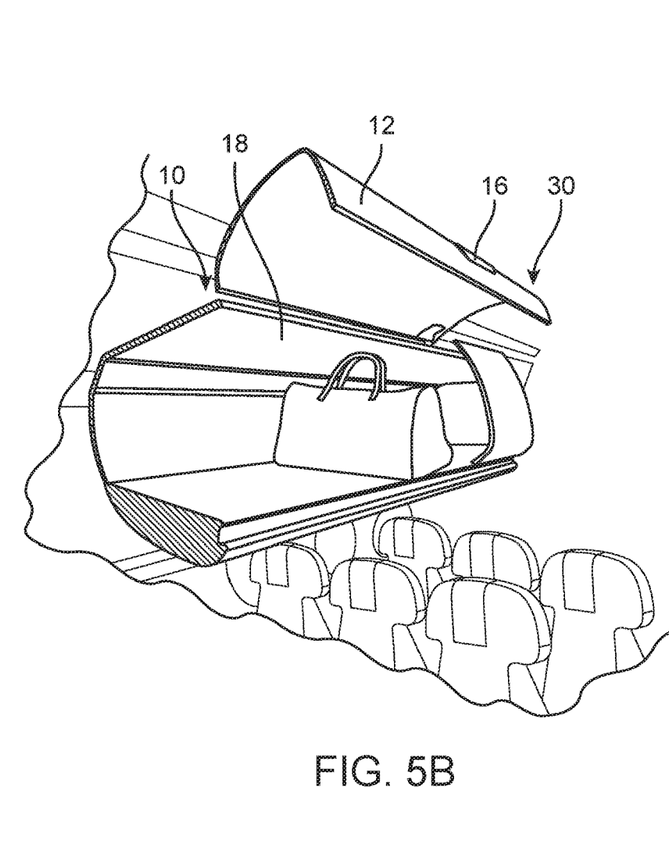
Figure 6A:
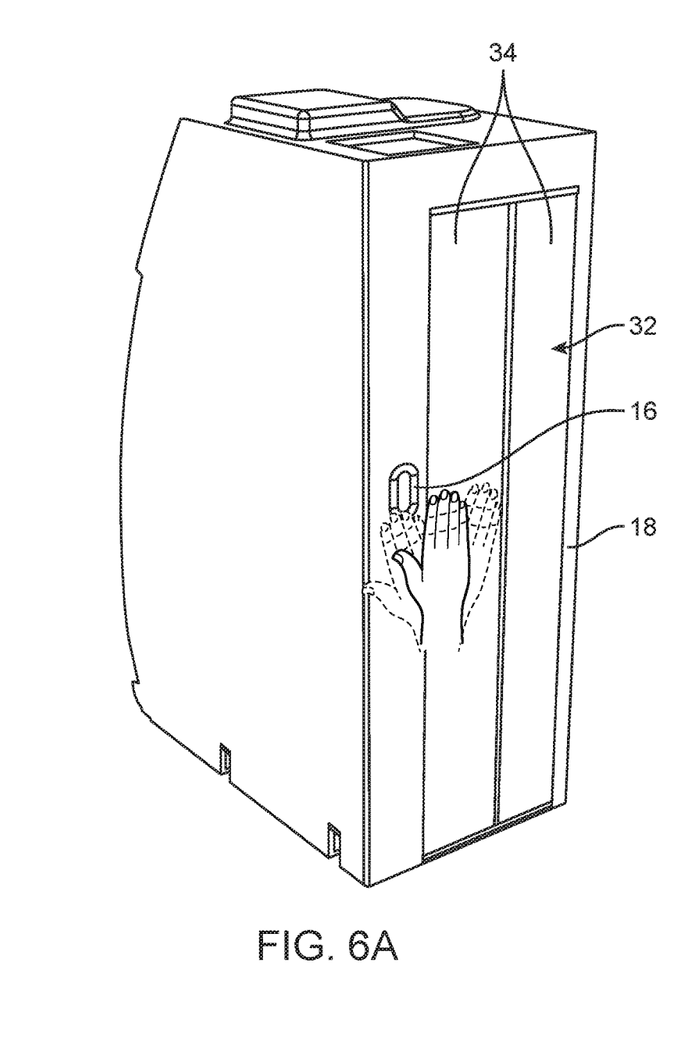
FIGS. 6A-6B are front perspective views of a lavatory incorporating a hands-free aircraft assembly, according to certain embodiments of the present invention.
Figure 6B:
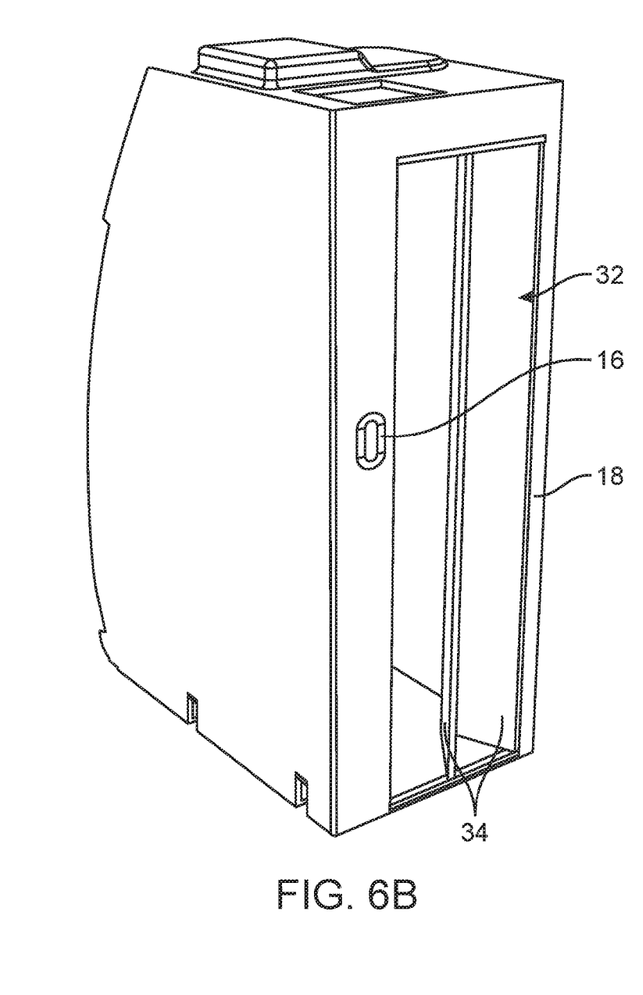

As best shown in FIGS. 5A-5B, the hands-free aircraft assembly 10 may be incorporated into an overhead bin 30. The elements of the hands-free aircraft assembly 10 incorporated into the overhead bin 30 may be the same or similar to those described above. For example, the hands-free aircraft assembly 10 may include a moveable component 12, e.g., the overhead bin door, at least one actuator, at least one input receiver 16, and a stationary component 18.

As best shown in FIGS. 6A-7B, the hands-free aircraft assembly 10 may be incorporated into a lavatory door 32. The elements of the hands-free aircraft assembly 10 incorporated into the lavatory door 32 may be the same or similar to those described above. For example, the hands-free aircraft assembly 10 may include a moveable component 12, e.g., the lavatory door 32, at least one actuator 14, at least one input receiver 16, and a stationary component 18.

In some embodiments, the lavatory door 32 may be divided into multiple door members 34. The multiple door members 34 may be coupled to one another and are pivotable relative to one another. At least one of the multiple door members 34 may have an edge 36 that is moveable along the linear translation track formed by the actuator 14.

Figure 7A:
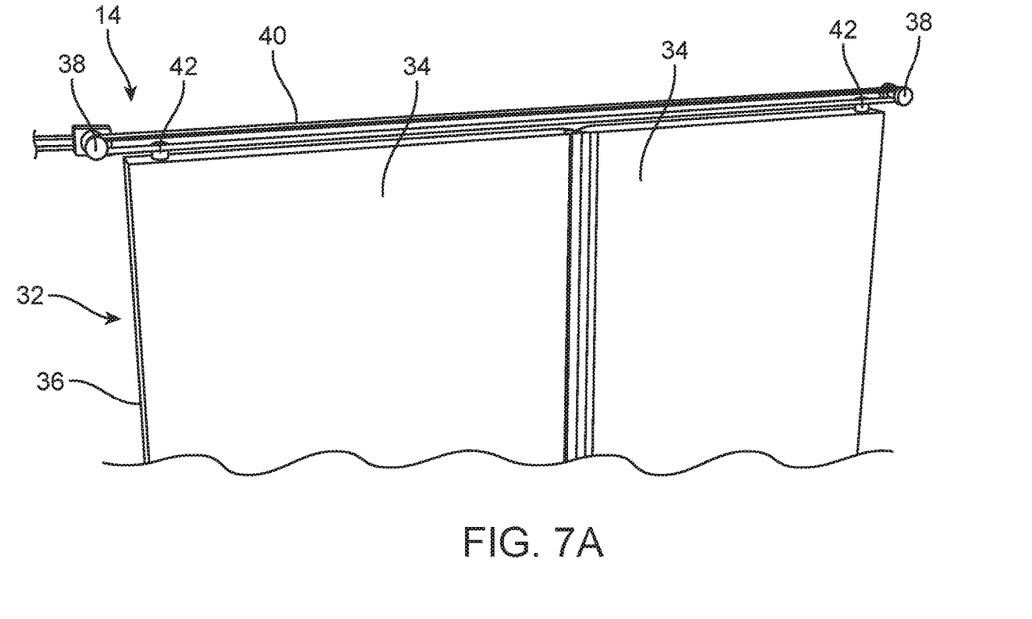
FIGS. 7A-7B are partial isolated views of the actuator and lavatory door of the lavatory of FIGS. 6A-6B.
Figure 7B:
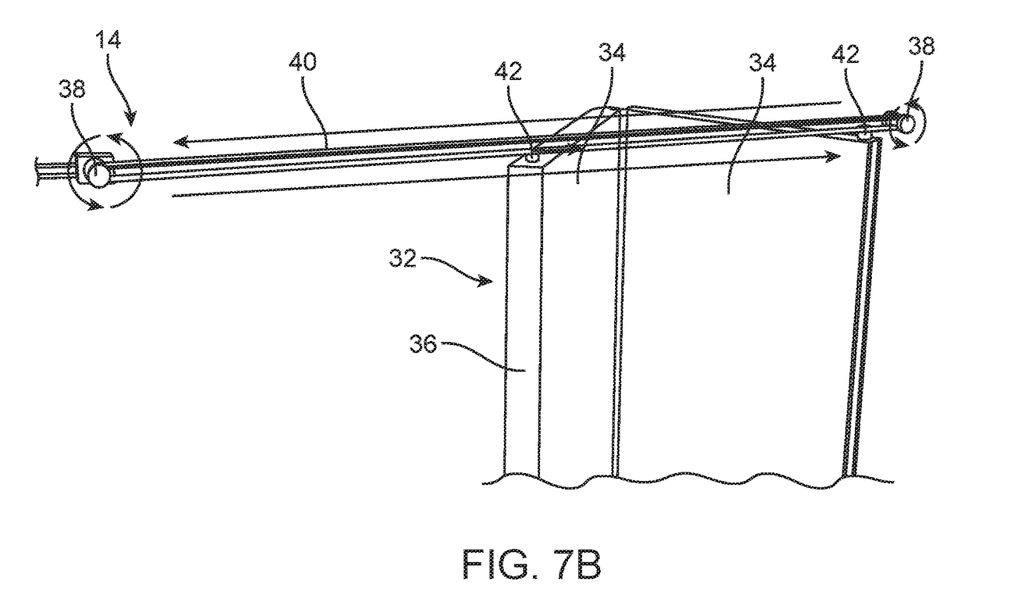

The actuator 14 may include at least one motor 38 and a drivebelt 40. The multiple door members 34 may be coupled to the drivebelt 40 at least one attachment point 42 to secure the multiple door members 34 to the drivebelt 40. Similar to as described above, the actuator 14 may be actuated based on receiving an activation signal from the at least one input receiver 16. Actuating the actuator 14 may cause the motors 38 to rotate and thus the drivebelt 40 to move. Due to the attachment of the multiple door members 34 to the drivebelt 40 at the at least one attachment point 42, the edge 36 may move along the linear translation track formed by the drivebelt 40 to open and close the lavatory door 32.

Incorporating the hands-free aircraft assembly 10 into various components of the passenger vehicle enables the automation of certain tasks, e.g., opening and closing seating compartment doors, opening and closing lavatory doors, opening and closing overhead bin doors, adjusting the position of a tray table, adjusting the position of a seat back, adjusting the position of a personal electronic device holder, etc., without the need for physical interaction between the passenger and the various components of the passenger vehicle. Requiring less or eliminating the need for physical interaction between the passenger and the various components of the passenger vehicle may help to reduce the spread of viruses and pathogens and increase the feeling of safety and security that a passenger may have when flying.

Elements of any of the embodiments discussed above may be fully interchangeable with one another. In the following, further examples are described to facilitate the understanding of the invention (and in some aspects, features of an apparatus or system described in one or more of these examples can be utilized in a method described in one of the other examples or vice versa):

Example 1. A passenger vehicle (which may incorporate features of any of the subsequent examples) comprising a hands-free door assembly, the hands-free door assembly comprising: a stationary wall portion; a door portion moveable along at least one linear translation track; at least one actuator operable to move the door portion along the at least one linear translation track; and at least one sensor positioned on at least one of the stationary wall portion or the door portion, wherein the sensor receives a hands-free input and transmits an activation signal to the at least one actuator, and wherein the at least one actuator moves the door portion along the at least one linear translation track based on receiving the activation signal.

Example 2. The passenger vehicle of Example 1 or any of the preceding or subsequent examples, wherein the at least one linear translation track is positioned at least partially within the stationary wall portion.

Example 3. The passenger vehicle of Example 1 or any of the preceding or subsequent examples, where in the at least one sensor comprises at least one of a proximity infrared sensor, a motion sensor, or an optical sensor.

Example 4. The passenger vehicle of Example 1 or any of the preceding or subsequent examples, further comprising a lock positioned on at least one of the stationary wall portion or the door portion, wherein the sensor receives a second contactless input and transmits a lock signal to activate the lock and prevent movement of the door portion.

Example 5. The passenger vehicle of Example 1 or any of the preceding or subsequent examples, wherein the hands-free input comprises a contactless input.

Example 6. The passenger vehicle of Example 1 or any of the preceding or subsequent examples, wherein the door portion comprises a first door member and a second door member, wherein the first door member comprises an edge moveable along the at least one linear translation track.

Example 7. The passenger vehicle of Example 6 or any of the preceding or subsequent examples, wherein the first door member is pivotable relative to the second door member.

Example 8. A method for activating a hands-free door of a passenger vehicle (which may incorporate features of any of the preceding or subsequent examples), the method comprising: receiving a hands-free input from at least one sensor positioned on at least one of a stationary wall portion or a door portion; transmitting an activation signal to at least one actuator, wherein the at least one actuator is operable to move the door portion along at least one linear translation track; and activating the at least one actuator based on the activation signal to move the door portion along the at least one linear translation track.

Example 9. The method of Example 8 or any of the preceding or subsequent examples, wherein the at least one linear translation track is positioned at least partially within the stationary wall portion.

Example 10. The method of Example 8 or any of the preceding or subsequent examples, where in the at least one sensor comprises at least one of a proximity infrared sensor, a motion sensor, or an optical sensor.

Example 11. The method of Example 8 or any of the preceding or subsequent examples, further comprising: receiving a second hands-free input from the at least one sensor; transmitting a lock signal to a lock positioned on at least one of the stationary wall portion or the door portion; and activating the lock to prevent movement of the door portion.

Example 12. The method of Example 8 or any of the preceding or subsequent examples, wherein the hands-free input comprises a contactless input.

Example 13. The method of Example 8 or any of the preceding or subsequent examples, wherein the door portion comprises a first door member and a second door member, wherein the first door member comprises an edge moveable along the at least one linear translation track.

Example 14. The method of Example 13 or any of the preceding or subsequent examples, wherein the first door member is pivotable relative to the second door member.

Example 15. A hands-free aircraft assembly (which may incorporate features of any of the preceding or subsequent examples) comprising: a moveable component; at least one actuator engaged with the moveable component; and at least one input receiver at least communicatively engaged with the at least one actuator, wherein actuation of the at least one actuator based on a hands-free input received by the at least one input receiver changes a position of the moveable component and is accomplished without direct contact by a passenger's hand.

Example 16. The hands-free aircraft assembly of Example 15 or any of the preceding or subsequent examples, wherein: the moveable component comprises at least one of a door portion, a tray table, a seat back, or a personal electronic device holder; the at least one actuator comprises at least one of a motor, a gear, a linear actuator, a cable, a belt, a piston, a pulley, or a cam; and the at least one input receiver comprises at least one of a sensor, a pedal, a button, a lever, or an audio input device.

Example 17. The hands-free aircraft assembly of Example 15 or any of the preceding or subsequent examples, wherein the hands-free input comprises a contactless input.

Example 18. The hands-free aircraft assembly of Example 15 or any of the preceding or subsequent examples, wherein the moveable component is at least one of pivotable or moveable along a linear direction.

Example 19. The hands-free aircraft assembly of Example 15 or any of the preceding or subsequent examples, further comprising a lock securable to the moveable component, wherein the lock is operable to maintain the moveable component in a closed position; wherein the at least one actuator is operable to move the lock between a locked position and an unlocked position based on receiving a lock activation signal from the at least one input receiver; and wherein the unlocked position releases the moveable component.

Example 20. The hands-free aircraft assembly of Example 19 or any of the preceding examples, wherein the position of the moveable component is moveable between a stowed position and a deployed position.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The invention claimed is:

1. A passenger vehicle comprising a hands-free door assembly, the hands-free door assembly comprising:
   a stationary wall portion, wherein the stationary wall portion comprises at least a portion of a seat shell surrounding a passenger seat compartment;
   a door portion moveable along at least one linear translation track;
   at least one actuator operable to move the door portion along the at least one linear translation track; and
   at least one sensor positioned on at least one of the stationary wall portion or the door portion,
   wherein the sensor receives a hands-free input and transmits an activation signal to the at least one actuator,
   wherein the at least one actuator moves the door portion along the at least one linear translation track based on receiving the activation signal to provide access to an interior of the passenger seat compartment; and
   wherein the at least one actuator includes a series of motors and gears located within an interior cavity of the stationary wall portion and at least partially along an upper edge and a lower edge of the door portion, the series of motors and gears functioning as the linear translation track and being coupled to a power source so that actuation of the series of motors and gears upon receiving power generated by the power source causes the door portion to slide into and out of the interior cavity of the stationary wall portion due to a rotational motion of the gears.

2. The passenger vehicle of claim 1, wherein the at least one linear translation track is positioned at least partially within the stationary wall portion.

3. The passenger vehicle of claim 1, wherein the at least one sensor comprises at least one of a proximity infrared sensor, a motion sensor, or an optical sensor.

4. The passenger vehicle of claim 1, further comprising a lock positioned on at least one of the stationary wall portion or the door portion, wherein the sensor receives a second contactless input and transmits a lock signal to activate the lock and prevent movement of the door portion.

5. The passenger vehicle of claim 1, wherein the hands-free input comprises a contactless input.

6. The passenger vehicle of claim 1, wherein the door portion comprises a first door member and a second door member, wherein the first door member comprises an edge moveable along the at least one linear translation track.

7. The passenger vehicle of claim 6, wherein the first door member is pivotable relative to the second door member.

8. A method for activating a hands-free door of a passenger vehicle, the method comprising:
   receiving a hands-free input from at least one sensor positioned on at least one of a stationary wall portion or a door portion, wherein the stationary wall portion comprises at least a portion of a seat shell surrounding a passenger seat compartment;
   transmitting an activation signal to at least one actuator, wherein the at least one actuator is operable to move the door portion along at least one linear translation track; and
   activating the at least one actuator based on the activation signal to move the door portion along the at least one linear translation track to provide access to an interior of the passenger seat compartment;
   wherein the at least one actuator includes a series of motors and gears located within an interior cavity of the stationary wall portion and at least partially along an upper edge and a lower edge of the door portion, the series of motors and gears functioning as the linear translation track and being coupled to a power source so that actuation of the series of motors and gears upon receiving power generated by the power source causes the door portion to slide into and out of the interior cavity of the stationary wall portion due to a rotational motion of the gears.

9. The method of claim 8, wherein the at least one linear translation track is positioned at least partially within the stationary wall portion.

10. The method of claim 8, wherein the at least one sensor comprises at least one of a proximity infrared sensor, a motion sensor, or an optical sensor.

11. The method of claim 8, further comprising:
receiving a second hands-free input from the at least one sensor;
transmitting a lock signal to a lock positioned on at least one of the stationary wall portion or the door portion; and
activating the lock to prevent movement of the door portion.

12. The method of claim 8, wherein the hands-free input comprises a contactless input.

13. The method of claim 8, wherein the door portion comprises a first door member and a second door member, wherein the first door member comprises an edge moveable along the at least one linear translation track.

14. The method of claim 13, wherein the first door member is pivotable relative to the second door member.

15. The passenger vehicle of claim 1, wherein the series of motors and gears are arranged so that there are always at least three points of contact between the door portion and the series of motors and gears for assisting with constraining the door portion to reduce motion in a perpendicular direction and to reduce shaking and wobbling of the door portion as the door portion translates into and out of the stationary wall portion.

16. The method of claim 8, wherein the series of motors and gears are arranged so that there are always at least three points of contact between the door portion and the series of motors and gears for assisting with constraining the door portion to reduce motion in the perpendicular direction and to reduce shaking and wobbling of the door portion as the door portion translates into and out of the stationary wall portion.

* * * * *